US008432666B2

(12) United States Patent  
Urmson

(10) Patent No.: US 8,432,666 B2  
(45) Date of Patent: Apr. 30, 2013

(54) METHOD OF MANUFACTURING A SWITCHGEAR PANEL

(75) Inventor: Michael G. Urmson, Deltona, FL (US)

(73) Assignee: ABB Technology AG, Zurich (CH)

( * ) Notice: Subject to any disclaimer, the term of this patent is extended or adjusted under 35 U.S.C. 154(b) by 773 days.

(21) Appl. No.: 12/270,190

(22) Filed: Nov. 13, 2008

(65) Prior Publication Data

US 2010/0118471 A1 May 13, 2010

(51) Int. Cl.
*H02B 5/00* (2006.01)
*B21K 21/16* (2006.01)
*H02G 3/14* (2006.01)
*A47G 29/00* (2006.01)

(52) U.S. Cl.
USPC ......... 361/605; 29/401.1; 174/67; 312/265.5; 248/27.1

(58) Field of Classification Search .................. 361/605, 361/608, 622, 626, 628, 630–631, 634, 807, 361/809–810; 29/401.1; 174/66, 67; 312/213, 312/236, 265.1–265.5; 248/27.1, 27.3
See application file for complete search history.

(56) References Cited

U.S. PATENT DOCUMENTS 3,495,135 A * 2/1970 Paape ............................ 361/608
4,249,227 A 2/1981 Kato et al.
5,822,180 A * 10/1998 Deschamps et al. .......... 361/627
6,494,779 B1 * 12/2002 Nicolai et al. ................ 454/184
7,140,702 B2 * 11/2006 Byron et al. ................... 312/296
2003/0019984 A1 * 1/2003 Yee et al. .................. 248/220.31
2003/0090182 A1 * 5/2003 Johnson ...................... 312/265.5
2005/0213294 A1 * 9/2005 Lambert et al. .............. 361/683
2008/0293293 A1 * 11/2008 Drane et al. .................. 439/536

FOREIGN PATENT DOCUMENTS

CH  503395 A  2/1971

OTHER PUBLICATIONS

Athina Nickitas-Etienne, International Preliminary Report on Patentability, The International Bureau of WIPO, Geneva, Switzerland, May 17, 2011.
Thierry Starck, Written Opinion of the International Searching Authority, European Patent Office, Netherlands, May 13, 2011.

* cited by examiner

*Primary Examiner* — Zachary M Pape

(74) *Attorney, Agent, or Firm* — Paul R. Katterle

(57) ABSTRACT

A method of making a panel for a switchgear cabinet is provided. In accordance with the method one or more base plates, a plurality of main cover plates of different types and a plurality of auxiliary cover plates of different types are provided. One or more main cover plates and one or more auxiliary cover plates are selected and mounted to the base plate. One or more electrical devices are mounted to at least one of the selected main cover plate and the selected auxiliary cover plate.

17 Claims, 7 Drawing Sheets

METHOD OF MANUFACTURING A SWITCHGEAR PANEL

BACKGROUND OF THE INVENTION

This invention generally relates to switchgear and more particularly to panels for switchgear cabinets.

A switchgear assembly for an electric power distribution system includes electrical apparatus and bus bars and cabling for connecting the electrical apparatus into the power distribution system. Typically, the electrical apparatus includes switching devices such as circuit breakers, disconnect switches for isolating parts of the distribution system, and transfer switches for connecting the distribution system to alternative power sources. The electrical apparatus also typically include low-voltage test, control and indicating devices such as test switches, breaker control switches, motor management relays, current and voltage meters and indicating lights.

Conventionally, the electrical apparatus of a switchgear assembly (such as a medium voltage switchgear assembly) is enclosed in a metal cabinet having a plurality of cells that are arranged horizontally and vertically. Each of the cells has a separate hinged door or panel in the front of the cabinet through which the electrical apparatus may be accessed. The low-voltage test, control and indicating devices are mounted in one or more low-voltage cells. Many of these low-voltage devices are mounted to the hinged panel of the low-voltage cell and are viewable/accessible from the outside thereof. Often, a low-voltage cell is located between upper and lower circuit breaker cells.

The hinged panel for a low-voltage cell is one of the most customized or unique components of a switchgear cabinet due to customer preferences and the differences in switchgear assemblies. Due to this uniqueness, the loss, damage or incorrect design of a hinged low-voltage panel can cause significant delays in manufacturing a switchgear assembly. Moreover, the requirement to specially design the hinged low-voltage panel of a switchgear assembly increases the cost of manufacturing the switchgear assembly.

Based on the foregoing, there is a need in the prior art to have an improved method of manufacturing a hinged low-voltage door or panel of a switchgear cabinet. The present invention is directed to such a method and to a switchgear cabinet having a panel manufactured by the method.

SUMMARY OF THE INVENTION

In accordance with the present invention, a method is provided for making a panel for a switchgear cabinet. In accordance with the method, a base plate, a plurality of main cover plates, a plurality of auxiliary cover plates, a hinge and a plurality of electrical devices are provided. The base plate has opposing first and second ends and a planar body. The body has a main opening and a plurality of smaller auxiliary openings. At least one of the main cover plates is of a first main cover type and at least another one of the main cover plates is of a different second main cover type. At least one of the auxiliary cover plates is of a first auxiliary cover type and at least another one of the auxiliary cover plates is of a different second auxiliary cover type. The hinge is mounted to the base plate at the first end. One of the main cover plates is selected, and one of the auxiliary cover plates is selected for each of the auxiliary openings. The selected main cover plate is mounted to the base plate so as to be disposed over the main opening. The selected auxiliary cover plates are mounted to the base plate so as to be disposed over the auxiliary openings, respectively. One or more of the electrical devices is mounted to at least one of the selected main cover plate and the selected auxiliary cover plates.

Also provided in accordance with the present invention is a switchgear cabinet having a housing and first and second doors. The housing includes vertically arranged first and second cells. The first cell has a first access opening and includes a pull-out substructure for supporting a circuit breaker. The second cell includes a second access opening and is adapted to at least partially enclose one or more control devices. The first door is movably connected to the housing to move between a closed position, wherein the first door covers the first access opening, and an open position, wherein the first door does not cover the first access opening. The second door is movably connected to the housing to move between a closed position, wherein the second door covers the second access opening, and an open position, wherein the second door does not cover the second access opening. The second door includes a base plate having a planar body with a main opening and smaller first and second auxiliary openings. A hinge pivotally connects the base plate to the housing. A main cover plate is mounted by fasteners to the base plate so as to be disposed over the main opening. The main cover plate has a width greater than a width of the main opening and has an opening formed therein. First and second auxiliary cover plates are mounted by fasteners to the base plate so as to be disposed over the first and second auxiliary openings, respectively. The first and second auxiliary cover plates have widths greater than the first and second auxiliary openings, respectively, and each of the first and second auxiliary cover plates have an opening formed therein. A first electrical device is mounted to the main cover plate so as to at least partially extend through the opening therein. A second electrical device is mounted to the first auxiliary cover plate so as to at least partially extend through the opening therein. A third electrical device is mounted to the second auxiliary cover plate so as to at least partially extend through the opening therein.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
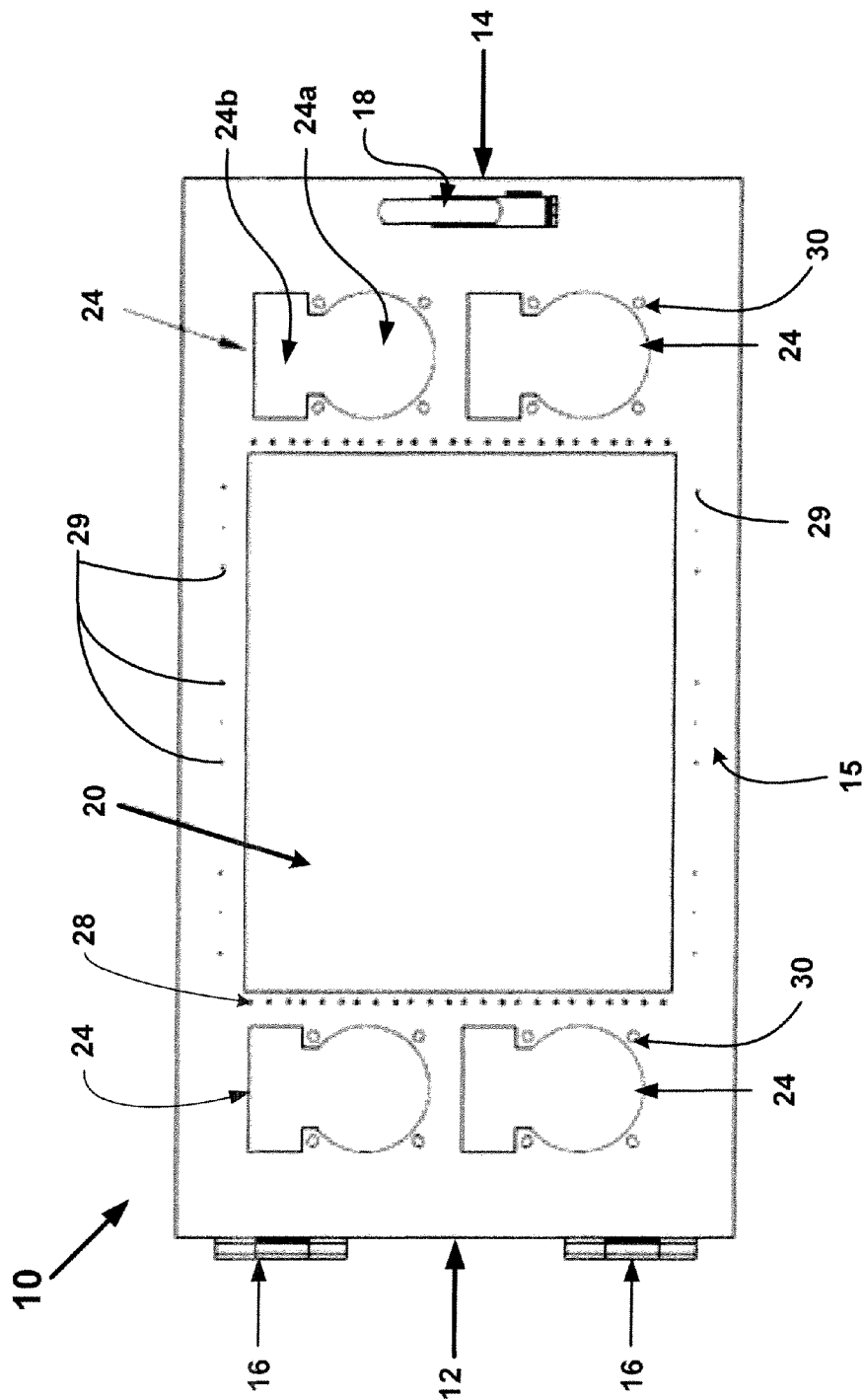
FIG. 1 shows a first base plate that may be used in the method of the present invention.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

The present invention is directed to a method of manufacturing a control door or panel of a switchgear cabinet using a plurality of base plates, a plurality of main cover plates, a plurality of auxiliary cover plates, each of which is comprised of metal, such as steel or aluminum, and has a thickness of about 1/16 of an inch (about 14 gauge). FIG. 1 shows a first base plate 10 that may be used in the method of the present invention. The first base plate 10 is rectangular in shape and has first and second ends 12, 14. The first base plate 10 is formed to have a planar body 15 integrally joined to a first end flange at the first end 12, a second end flange at the second end 14, and top and bottom flanges. A pair of hinges 16 are mounted to the first base plate 10, such as to the first end flange. A handle 18 for moving the door or panel of the switchgear cabinet is also mounted to the first base plate 10, toward the second end 14. The hinges 16 and the handle 18 may be mounted to the first base plate 10 before or after the auxiliary plates are mounted to the first base plate 10.

An enlarged main opening 20 and a plurality of auxiliary openings 24 are formed in the body 15. The main opening 20 is rectangular in shape and is substantially centered in the body 15. A plurality of mounting holes 28 are formed in, and extend through the body 15. The mounting holes 28 are disposed on first and second sides of the main opening 20. On each side, the mounting holes 28 are arranged close together and in a line. Above and below the main opening 20, groups of smaller mounting openings 29 are formed in the body 15 for mounting nameplates.

Each of the auxiliary openings 24 is comprised of a circular portion 24a adjoining a rectangular portion 24b. Mounting openings 30 are arranged in a square pattern around the circular portion 24a of each auxiliary opening 24. A vertically-arranged first pair of the auxiliary openings 24 are arranged on the first side of the main opening 20 and a vertically-arranged second pair of the auxiliary openings 24 are arranged on the second side of the main opening 20. The auxiliary openings 24 and the associated mounting openings 30 are positioned such that auxiliary cover plates of the same size can be mounted over adjacent auxiliary openings 24.

In one example embodiment of the present invention, the first base plate 10 has a width of about thirty-six inches and a height of about nineteen inches, and the main opening 20 has a width of about nineteen inches and a height of about fourteen inches. In this example embodiment, the circular portion of each auxiliary opening 24 has a diameter of four and one-half inches and each of the auxiliary cover plates has a width of five inches and a height of seven inches.

Figure 2:
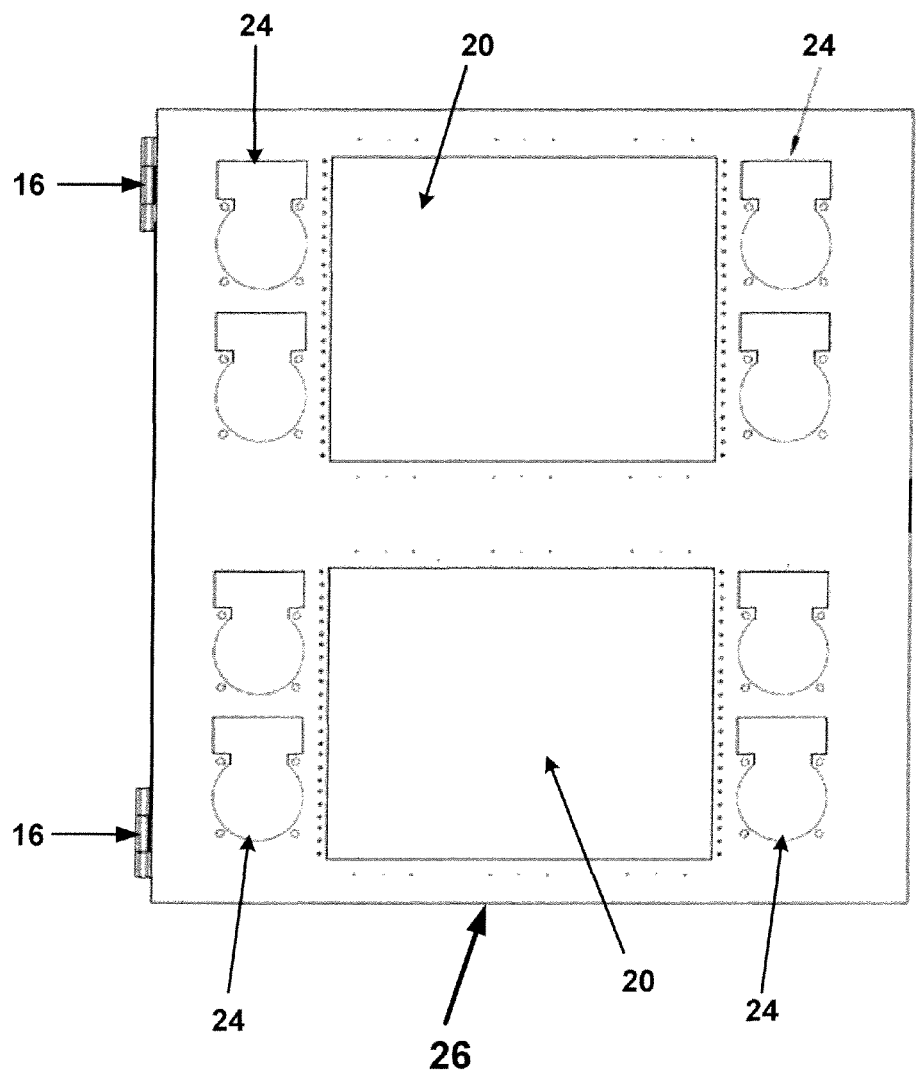
FIG. 2 shows a second base plate that may be used in the method.

Referring now to FIG. 2, there is shown a second base plate 26 that may be used in the method of the present invention. The second base plate 26 has the same construction as the first base plate 10, except the second base plate 26 is twice as high as the first base plate 10 and has an additional main opening 20 with associated auxiliary openings 24. In addition, the second base plate 26 does not have a handle 18 or an opening therefore.

For purposes of brevity, only two examples of base plates are shown and described herein, namely the first and second base plates 10, 26. It should be appreciated that a plurality of other base plates may be provided. Each of these other base plates have a construction different from each other and different from the first and second base plates 10, 26.

Figure 3:
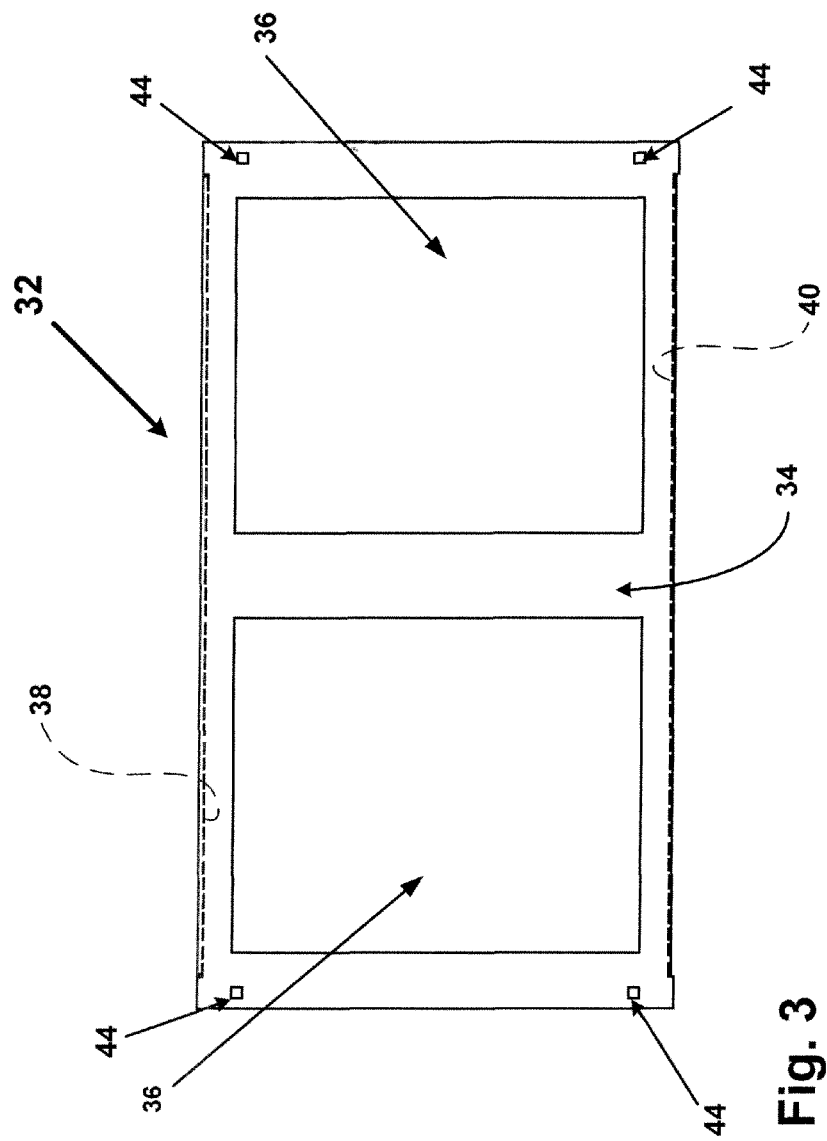
FIG. 3 shows a first main cover plate that may be used in the method.

Referring now to FIG. 3, there is shown a first main cover plate 32, which is adapted for mounting to the first base plate 10 (or the second base plate 26) over the main opening 20. The first main cover plate 32 is constructed to mount two large-size control or monitoring devices, such as relays or meters. The first main cover plate 32 is rectangular in shape and includes a planar body 34 with two enlarged major openings 36 formed therein. The major openings 36 are each rectangular in shape. A top flange 38 is integrally joined to a top of the body 34, while a bottom flange 40 is integrally joined to a bottom of the body 34. Mounting openings 44 are disposed proximate to the corners of the body 34, respectively. The first main cover plate 32 has a width that is greater than the main opening 20 of the first base plate 10 so that opposing end portions of the first main cover plate 32 overlap opposing side portions of the first base plate 10 adjacent to the main opening 20, respectively, and the two mounting openings 44 in each end portion align with mounting holes 28 in the first base plate 10. The first main cover plate 32 has a height that is less than the height of the main opening 20. In this manner, when the first main cover plate 32 is mounted to the first base plate 10, the first main cover plate 32 does not extend over a portion 48 (shown in FIG. 9) of the main opening 20.

Figure 4:
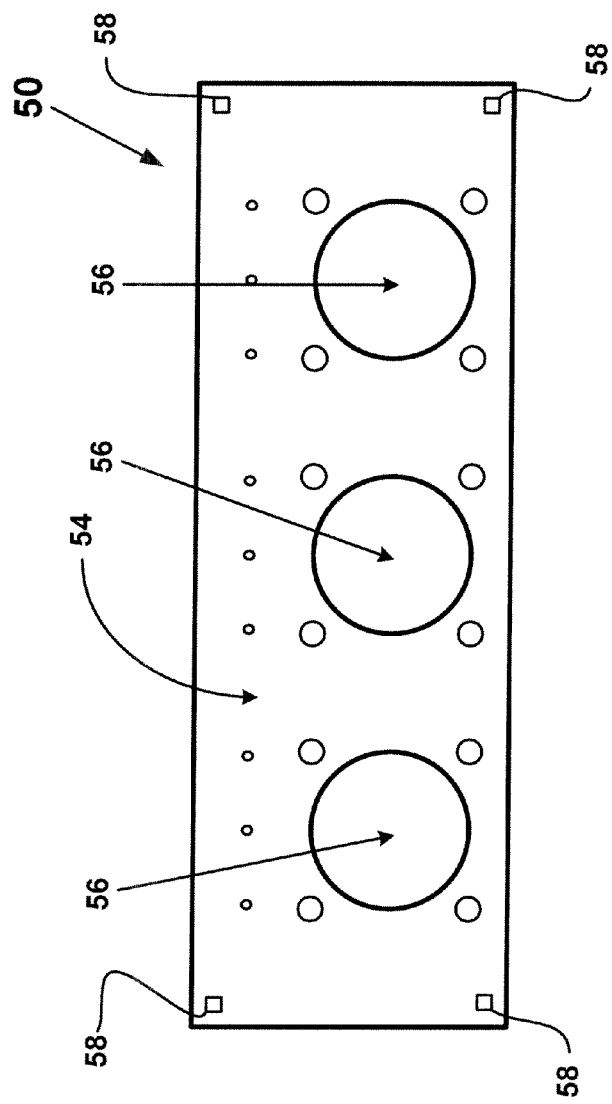
FIG. 4 shows a second main cover plate that may be used in the method.

Referring now to FIG. 4, there is shown a second main cover plate 50, which is adapted for mounting to the first base plate 10 (or the second base plate 26) over the main opening 20. The second main cover plate 50 is constructed to mount three medium-size control or monitoring devices, such as meters or switches. The second main cover plate 50 is rectangular in shape and includes a planar body 54 with three circular openings 56 formed therein. Mounting openings 58 are disposed proximate to the corners of the body 54, respectively. The second main cover plate 50 has a width that is greater than the main opening 20 of the first base plate 10 so that opposing end portions of the second main cover plate 50 overlap opposing side portions of the first base plate 10 adjacent to the main opening 20, respectively, and the two mounting openings 58 in each end portion align with mounting holes 28 in the first base plate 10. The second main cover plate 50 has a height that is less than the height of the main opening 20. More particularly, the second main cover plate 50 has a height that is about half the height of the main opening 20. In this manner, a pair of vertically-arranged second main cover plates 50 may be mounted to the first base plate 10 over the main opening 20.

For purposes of brevity, only two examples of main cover plates are shown and described herein, namely the first and second main cover plates 32, 50. It should be appreciated that a plurality of other main cover plates adapted for mounting to the first base plate 10 (or the second base plate 26) over the main opening 20 may be provided. Each of these other main cover plates have a construction different from each other and different from the first and second main cover plates 32, 50. By way of example, but without limitation, a third main cover plate may be provided that is substantially the same as the first main cover plate 32, except the third main cover plate has a greater height and fully covers the main opening 20.

Figure 5:
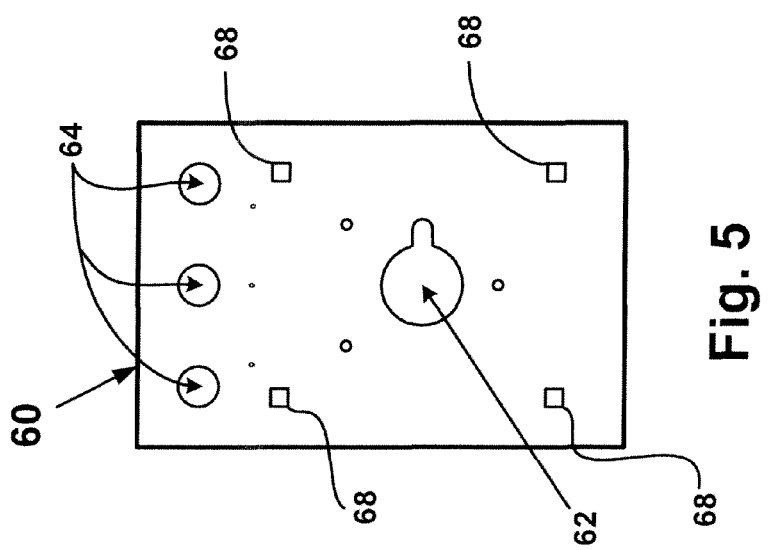
FIG. 5 shows a first auxiliary cover plate that may be used in the method.

Referring now to FIG. 5, there is shown a first auxiliary cover plate 60, which is adapted for mounting to the first base plate 10 (or the second base plate 26), over an auxiliary opening 24. The first auxiliary cover plate 60 is constructed to mount a control switch, three LED (light-emitting-diode) indicating lights and a nameplate. The first auxiliary cover plate 60 is rectangular in shape and has a keyed main opening 62 through which the control switch may extend, three circular openings 64 through which the LED indicating lights extend and nameplate openings for mounting the nameplate.

In addition, mounting openings 68 are formed in, and extend through, the first auxiliary cover plate 60.

Figure 6:
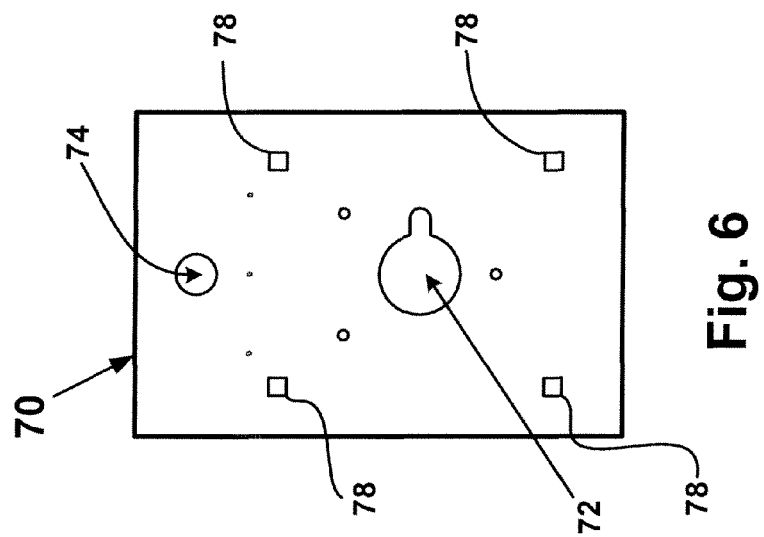
FIG. 6 shows a second auxiliary cover plate that may be used in the method.

Referring now to FIG. 6, there is shown a second auxiliary cover plate 70, which is adapted for mounting to the first base plate 10 (or the second base plate 26), over an auxiliary opening 24. The second auxiliary cover plate 70 is constructed to mount a lock-out relay, a single LED indicating light and a nameplate. The second auxiliary cover plate 70 is rectangular in shape and has a keyed main opening 72 through which the lock-out relay may extend, a circular opening 74 through which the LED indicating light extends and nameplate openings for mounting the nameplate. In addition, mounting openings 78 are formed in, and extend through, the second auxiliary cover plate 70.

Figure 7:
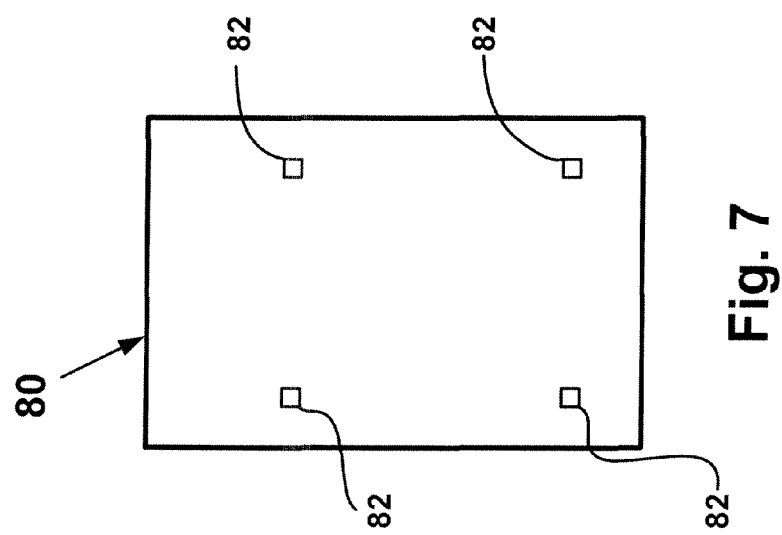
FIG. 7 shows a third auxiliary cover plate that may be used in the method.

Referring now to FIG. 7, there is shown a third auxiliary cover plate 80, which is adapted for mounting to the first base plate 10 (or the second base plate 26), over an auxiliary opening 24. The third auxiliary cover plate 80 is rectangular in shape and is constructed to function as a blanking plate, i.e., to only cover the auxiliary opening 24 and not mount any devices. Thus, the only openings in the third auxiliary cover plate 80 are four mounting openings 82.

Figure 8:
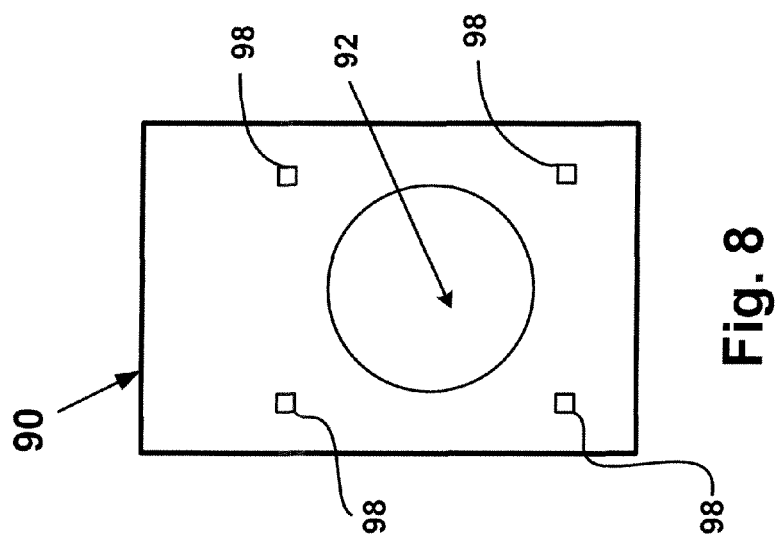
FIG. 8 shows a fourth auxiliary cover plate that may be used in the method.

Referring now to FIG. 8, there is shown a fourth auxiliary cover plate 90, which is adapted for mounting to the first base plate 10 (or the second base plate 26), over an auxiliary opening 24. The fourth auxiliary cover plate 90 is constructed to mount a single meter and a nameplate. The fourth auxiliary cover plate 90 is rectangular in shape and has a circular main opening 92 through which the meter may extend and nameplate openings for mounting the nameplate. In addition, mounting openings 98 are formed in, and extend through, the fourth auxiliary cover plate 90.

For purposes of brevity, only four examples of auxiliary cover plates are shown and described herein, namely the first, second, third and fourth cover plates 60, 70, 80 and 90. It should be appreciated that a plurality of other auxiliary cover plates adapted for mounting to the first base plate 10 (or the second base plate 26) over the main opening 20 may be provided. Each of these other auxiliary cover plates have a construction different from each other and different from the first, second, third and fourth cover plates 60, 70, 80 and 90.

In accordance with the method of the present invention, a manufacturing facility maintains in inventory a plurality of each of: the first base plate 10, the second base plate 26, the first main cover plate 32, the second main cover plate 50, the first auxiliary cover plate 60, the second auxiliary cover plate 70, the third auxiliary cover plate 80, the fourth auxiliary cover plate 90 and other types of base plates, main cover plates and auxiliary cover plates. When an order for a switchgear cabinet from a customer is received, an engineer or technician at the manufacturing facility will review the order and determine the electrical devices that need to be mounted to a control panel for the cabinet and any specified arrangement of these electrical devices. Based on this determination, the engineer or technician will select the required type of the base plate and the required types and quantities of the main cover plates and the auxiliary cover plates. The selected plates will then be retrieved from inventory. The selected main cover plate(s) and the selected auxiliary cover plate(s) are mounted to the selected base plate using fasteners such as carriage bolts, studs, or rivets, thereby forming a configured panel structure. Electrical devices are then mounted to the configured panel structure. The electrical devices may include lock-out relays, circuit breaker (CB) control switches, current and voltage meters, motor management relays and test switches.

It should be appreciated that instead of mounting the electrical devices to the configured panel structure after it has been formed from the base plate, the main cover plate(s) and the auxiliary cover plate(s), the electrical devices could (in some instances) be mounted to the main cover plate(s) and/or the auxiliary cover plates before the main cover plate(s) and the auxiliary cover plates are mounted to the base plate.

A specific example of the method of the present invention will now be given. In the example, the various plates have the dimensions given in the example embodiment set forth above. A customer order is received for a switchgear cabinet having a low-voltage cell that requires a panel with a height of nineteen inches and which can mount two motor management relays 100 (each with an associated nameplate), three test switches 102 (each with associated nameplate), two CB control switches 104 (each with an associated nameplate and 3 LED indicating lights) and two lock-out relays 106 (each with an associated nameplate and a single LED indicating light). Based on these requirements, an engineer or technician determines that a single first base panel 10, a single first main cover plate 32, two first auxiliary cover plates 60 (for the CB control switches 104) and two second auxiliary cover plates 70 (for the lock-out relays 106) are required.

The first main cover plate 32 is disposed over the main opening 20 such that the mounting openings 44 in the first main cover plate 32 are aligned with mounting holes 28 in the first base plate 10 on the first and second sides of the main opening 20. Fasteners are then inserted through the aligned mounting openings 44 and mounting holes 28, thereby securing the first main cover plate 32 to the first base plate 10. The two first auxiliary cover plates 60 are respectively disposed over the auxiliary openings 24 on the second side of the main opening 20 such that the mounting openings 68 in the first auxiliary cover plates 60 are aligned with the mounting openings 30 in the first base plate 10. Fasteners are then inserted through the aligned mounting openings 68, 30, thereby securing the two first auxiliary cover plates 60 to the first base plate 10. The two second auxiliary cover plates 70 are respectively disposed over the auxiliary openings 24 on the first side of the main opening 20 such that the mounting openings 78 in the second auxiliary cover plates 70 are aligned with the mounting openings 30 in the first base plate 10. Fasteners are then inserted through the aligned mounting openings 78, 30, thereby securing the two second auxiliary cover plates 60 to the first base plate 10.

Figure 9:
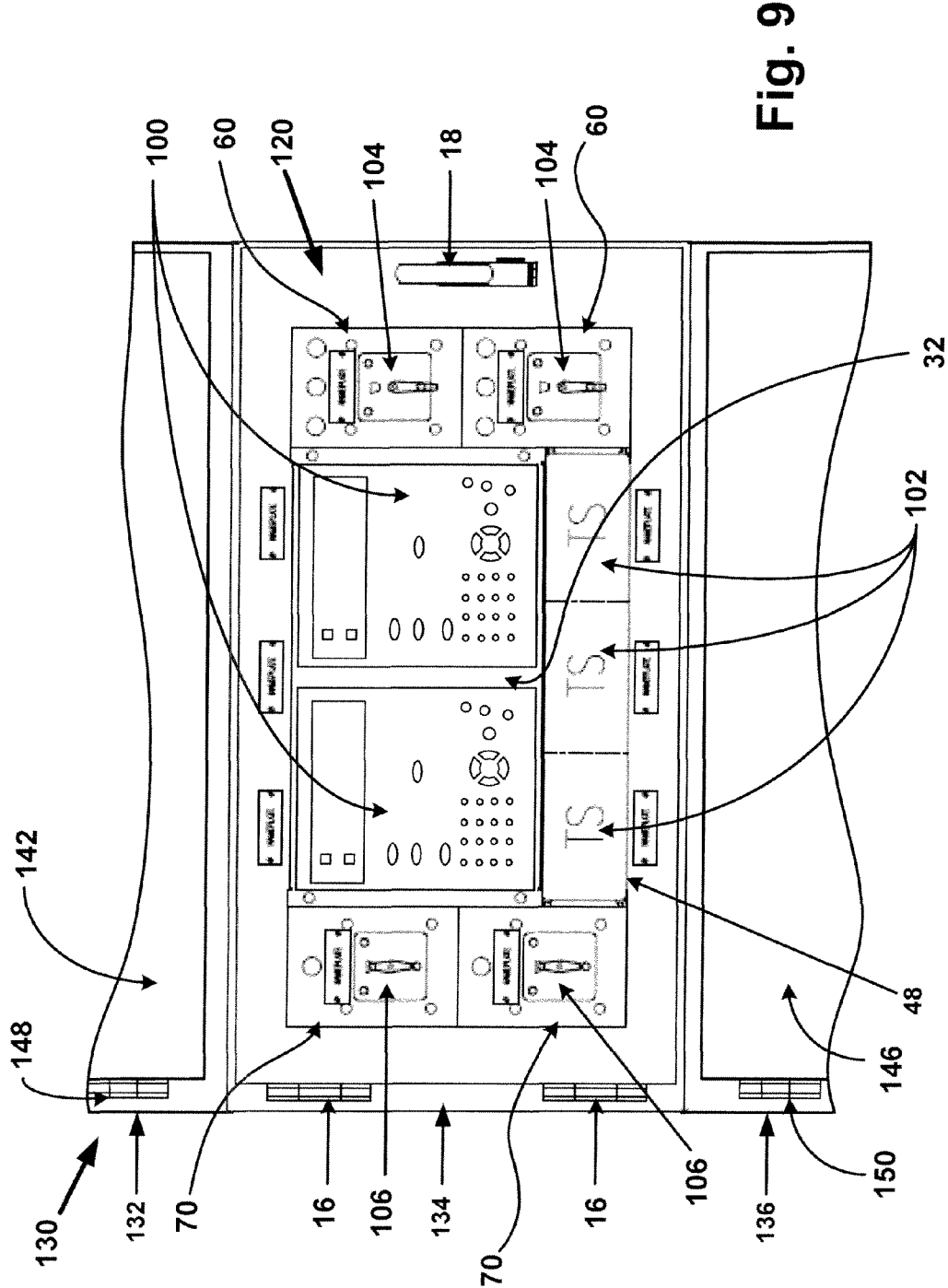
FIG. 9 shows a portion of a switchgear cabinet having a panel formed by the method.

Once the first main cover plate 32, the two first auxiliary cover plates 60 and the two second auxiliary cover plates 70 are secured to the first base panel 10, the electrical devices are then mounted. The relays 100 and associated nameplates are mounted to the first main cover plate 32 and the test switches 102 are mounted in the portion 48 of the main opening 20 that is located between a lower edge of the first main cover plate 32 and a lower edge of the main opening 20. The name plates for the test switches 102 are mounted to the first base plate 10, below the test switches 102. The CB control switches 104 (and associated nameplates and LED indicating lights) are mounted to the first auxiliary cover plates 60, and the lock-out relays 106 (and associated nameplates and LED indicating lights) are mounted to the second auxiliary cover plates 70. Once all of the electrical devices have been mounted, a completed control panel 120 is formed, as shown in FIG. 9. The control panel 120 is then mounted to a switchgear cabinet 130 by the hinges 16.

As is shown in FIG. 9, the switchgear cabinet 130 may have three vertically arranged cells 132, 134, 136, with the control panel 120 being mounted to the middle cell 134. The top and bottom cells 132, 136 may each contain a circuit breaker mounted to a pull-out substructure, such as is disclosed in U.S. Pat. No. 7,124,488, which is hereby incorporated by reference. The circuit breakers and other switchgear apparatus may be medium voltage, i.e., about 1 kilivolt (kV) to about 40 kV. Each of the cells 132, 134, 136 has an access opening through which the interior of the cell may be accessed. The cells 132, 136 have doors 142, 146, respectively, that are connected to the cabinet 130 by hinges 148, 150, respectively, and are operable to open and close the access openings in the cells 132, 136, respectively. The control panel 120 is operable to open and close the access opening in the cell 134.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method of making a panel for a switchgear cabinet, the method comprising:
    providing a base plate with opposing first and second ends and comprising a planar metal body, the body having a main opening and a plurality of auxiliary openings;
    providing a plurality of main cover plates, at least one of the main cover plates being of a first main cover type and at least another one of the main cover plates being of a different second main cover type;
    providing a plurality of auxiliary cover plates, at least one of the auxiliary cover plates being of a first auxiliary cover type and at least another one of the auxiliary cover plates being of a different second auxiliary cover type;
    providing a hinge;
    providing a plurality of electrical devices;
    mounting the hinge to the base plate at the first end;
    selecting one of the main cover plates;
    selecting one of the auxiliary cover plates for each of the auxiliary openings;
    after performing the step of providing the base plate with the body having the main opening and the auxiliary openings, mounting the selected main cover plate to the base plate so as to be disposed over the main opening;
    after performing the step of providing the base plate with the body having the main opening and the auxiliary openings, mounting the selected auxiliary cover plates to the base plate so as to be disposed over the auxiliary openings, respectively; and
    mounting one or more of the electrical devices to at least one of the selected main cover plate and the selected auxiliary cover plates.

2. The method of claim 1, wherein a first auxiliary opening is located on a first side of the main opening and a second auxiliary opening is located on an opposing second side of the main opening, and wherein the step of mounting the selected auxiliary cover plates comprises mounting first and second auxiliary plates to the base plate over the first and second auxiliary openings, respectively.

3. The method of claim 2, wherein the first and second auxiliary plates each comprise an opening, and wherein the step of mounting one or more of the electrical devices comprises:
    mounting a first electrical device to the first auxiliary plate so as to at least partially extend through the opening therein; and
    mounting a second electrical device to the second auxiliary plate so as to at least partially extend through the opening therein.

4. The method of claim 3, wherein the selected main cover plate has a major opening formed therein, the major opening being larger than either of the openings in the first and second auxiliary plates.

5. The method of claim 4, wherein the step of mounting one or more of the electrical devices further comprises mounting a third electrical device to the selected main cover plate.

6. The method of claim 5, wherein the first electrical device is a lock-out relay, the second electrical device is a circuit breaker control switch and the third electrical device is a motor management relay.

7. The method of claim 1, wherein the step of mounting one or more of the electrical devices is performed after the step of mounting the selected main cover plate and the step of mounting the selected auxiliary cover plates.

8. The method of claim 1, wherein the selected main cover plate has a width that is greater than a width of the main opening, and the selected auxiliary cover plates have greater widths than the widths of the auxiliary openings, respectively.

9. The method of claim 8, wherein the selected main cover plate has a height that is less than the height of the main opening, whereby when the selected main cover plate is mounted to the base plate, the selected main cover plate does not extend over an uncovered portion of the main opening.

10. The method of claim 9, wherein the step of mounting the one or more of the electrical devices comprises mounting a first electrical device to the base plate so as to at least partially extend through the uncovered portion of the main opening.

11. The method of claim 10, wherein the first electrical device is a test switch.

12. The method of claim 1, wherein the main opening is a first main opening and the selected main cover plate is a first main cover plate, and wherein the base plate further has a second main opening formed therein, the second main opening being larger than the auxiliary openings and being located above the first main opening; and wherein the method further comprises:
    selecting a second one of the main cover plates; and
    mounting the second main cover plate to the base plate so as to be disposed over the second main opening.

13. The method of claim 12, wherein a first auxiliary opening is located on a first side of the first main opening, a second auxiliary opening is located on an opposing second side of the first main opening, a third auxiliary opening is located on a first side of the second main opening, and a fourth auxiliary opening is located on an opposing second side of the second main opening; and
    wherein the step of mounting the selected auxiliary cover plates comprises mounting first, second, third and fourth auxiliary plates to the base plate over the first, second, third and fourth auxiliary openings, respectively.

14. The method of claim 1, further comprising:
    providing a handle; and
    mounting the handle to the base plate toward the second end.

15. The method of claim 1, wherein the main opening is rectangular and each of the auxiliary openings comprises a rectangular portion adjoining a circular portion.

16. The method of claim 1, wherein the base plate has a plurality of main mounting holes disposed around at least a portion of the main opening and a plurality of auxiliary mounting holes disposed around at least a portion of each of the auxiliary openings;

wherein each of the main cover plates has a plurality of main mounting holes formed therein and each of the auxiliary cover plates has a plurality of auxiliary mounting holes formed therein;

wherein the step of mounting the selected main cover plate comprises aligning the main mounting holes in the base plate with the main mounting holes in the selected main cover plate and inserting fasteners through the aligned main mounting holes; and wherein the step of mounting the selected auxiliary cover plates comprises: for each selected auxiliary cover plate, aligning the auxiliary mounting holes in the base plate with the auxiliary mounting holes in the selected auxiliary cover plate and inserting fasteners through the aligned auxiliary mounting holes.

17. The method of claim 16, wherein the fasteners comprise threaded bolts.

\* \* \* \* \*